Figure 1:
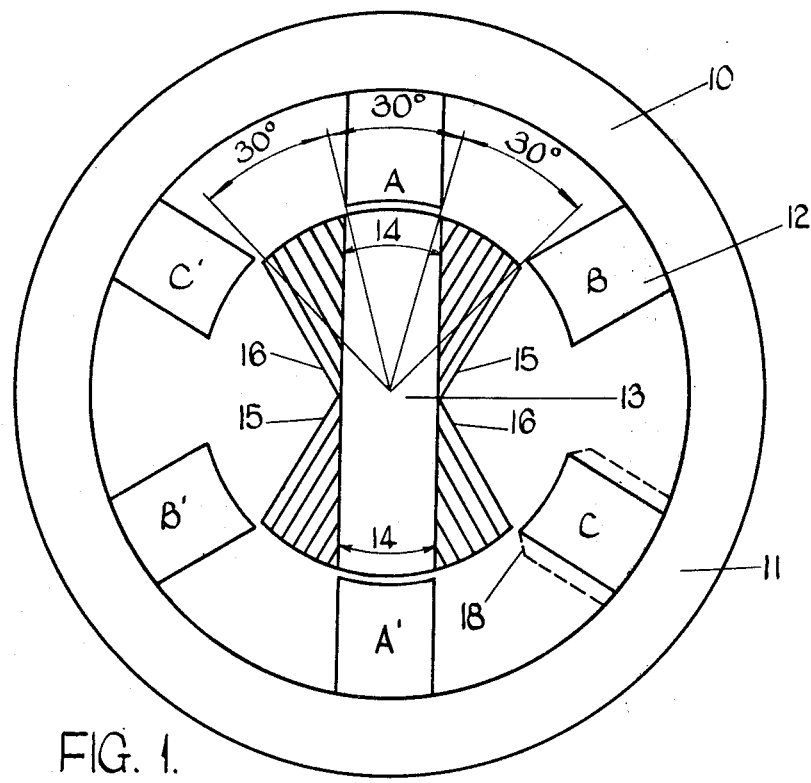

United States Patent [19]
Walker et al.

[11] 3,959,672
[45] May 25, 1976

[54] ELECTRIC MACHINES

[75] Inventors: Michael Edward Walker, Redditch; Peter Timothy Wooding, Sparkhill, both of England

[73] Assignee: C.A.V. Limited, Birmingham, England

[22] Filed: Jan. 20, 1975

[21] Appl. No.: 542,383

[30] Foreign Application Priority Data
Jan. 22, 1974   United Kingdom............... 2929/74

[52] U.S. Cl................................ 310/36; 340/49 R; 340/162; 335/272
[51] Int. Cl.²........................................ H02K 19/06
[58] Field of Search............................... 310/36–39, 310/49, 168, 114, 126, 112, 162–165; 335/272

[56] References Cited
UNITED STATES PATENTS

| | | |
|---|---|---|
| 2,108,662 | 2/1938 | Fisher .................................. 310/168 |
| 2,767,357 | 10/1956 | Naybor ................................ 335/272 |
| 3,171,049 | 2/1965 | Jarret et al. ......................... 310/168 |
| 3,183,387 | 5/1965 | Wasynczuk ..................... 310/168 X |
| 3,389,281 | 6/1968 | Ellis .................................... 310/168 |

*Primary Examiner*—Donovan F. Duggan

[57] ABSTRACT

A variable reluctance electric motor comprises a stator including at least three pairs of pole pieces with windings surrounding at least one of the pole pieces of each pair, and a rotor structure. The rotor structure defines a pair of opposed pole pieces each having circumferentially extending extensions on the opposite sides thereof. The extensions extend at least to the adjacent pair of stator pole pieces when the rotor pole pieces are aligned with stator pole pieces, and be selective energisation of the pairs of stator pole pieces, the rotor can be made to move angularly in either direction.

9 Claims, 4 Drawing Figures

ELECTRIC MACHINES

This invention relates to variable reluctance electric motors and has for its object to provide such a motor in a simple and convenient form.

According to the invention, a variable reluctance motor comprises a stator structure having at least three pairs of diametrically disposed pole pieces, a winding surrounding at least one pole piece of each pair of pole pieces, a rotor structure in said space, said rotor structure having a pair of interconnected pole pieces, said windings in use, being energised sequentially to produce rotation of the rotor structure, the rotor pole pieces each having circumferential extensions on opposite sides thereof, said extensions when a stator pole face is aligned with a rotor pole face, extending circumferentially beyond the stator pole face, the extensions having a smaller cross sectional area than the rotor pole face, the arrangement being such that depending upon the order in which the stator windings are energised, the rotor structure will move to minimise the reluctance of the magnetic path constituted by the stator and rotor structures.

According to a further feature of the invention, the rotor structure is formed from a stack of laminations at least some of which are angularly displaced relative to the remaining laminations of the stack so as to define said extensions.

Figure 2:
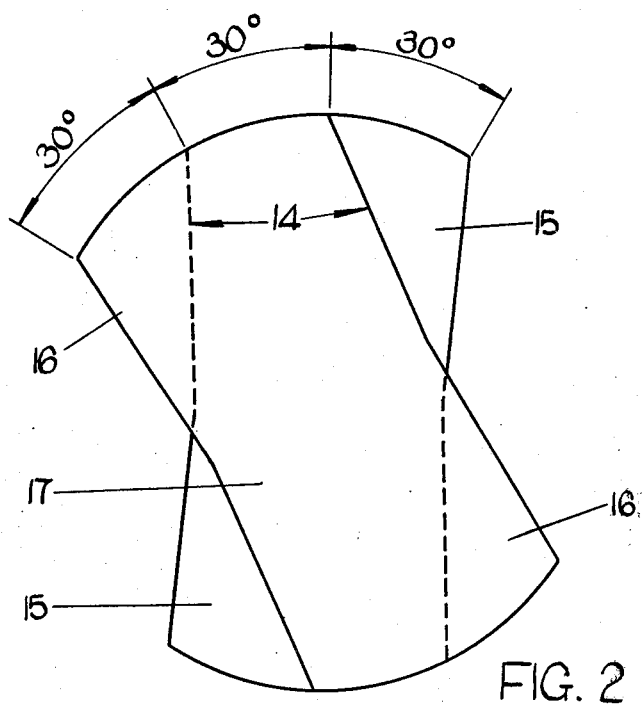
Figure 3:
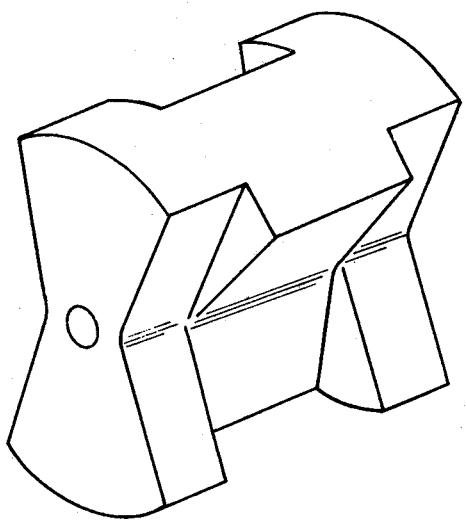
Figure 4:
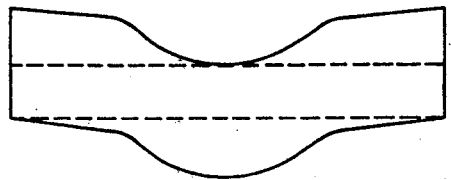

One example of a variable reluctance motor in accordance with the invention, will now be described with reference to the accompanying diagrammatic drawings, in which:

FIG. 1 shows a section through the machine,
FIG. 2 shows in end view, the rotor structure,
FIG. 3 is a perspective view of a rotor structure, and
FIG. 4 is a plan view of the rotor pole face of a modified rotor structure.

Referring to the drawings, the motor comprises a stator structure 10 which is constituted by a hollow cylindrical yoke 11 on the internal periphery of which are mounted pole pieces, 12. In the particular example, three pairs of diametrically opposed pole pieces 12 are provided, and for convenience the pairs of pole pieces are referenced AA', BB', CC'.

The pole pieces are provided with windings not shown, and the windings on a pair of diametrically opposed pole pieces are connected so that when supplied with a uni-directional current, the pole pieces of the pair will be of opposite magnetic polarity.

The flow of electric current through the windings is controlled by a control circuit such that the axis of magnetization rotates in one direction or the other. It should be noted that the direction of magnetization is not important and so whilst it is possible to so energize the windings in sequence so that the direction of magnetization along the axis of magnetization remains the same, it is equally possible to energise the windings so that reversal of the direction of magnetization takes place along the axis of magnetization as the latter is shifted angularly.

Whilst it has been mentioned that the windings of a pair of pole pieces are energised in turn, it is to be understood that partial energisation of the windings of other pairs of pole pieces may take place whilst the windings of a particular pair of pole pieces are energised.

The machine also includes a rotor structure 13 defining a pair of diametrically disposed pole pieces 14, the circumferential limits of which are indicated by the arrows in FIG. 1. The circumferential length of the pole pieces 14 is substantially equal to the circumferential length of the pole pieces 12. In addition, each pole piece 14 is provided with circumferential extensions 15 and 16 on the opposite sides thereof, the extensions being indicated by the shade areas in FIG. 1. The circumferential length of the extensions 15 and 16 is substantially equal to the circumferential length of the pole pieces 14, and in the particular example the extensions extend to the edges of the adjacent pole pieces 12. They may however extend so that they overlap substantially up to half the adjacent pole pieces 12.

The rotor structure is of laminated construction, and the pole pieces 14 can be considered as being of solid material having a particular cross sectional area. The extensions 15 and 16, however, are of reduced cross sectional area as compared with the pole pieces 14.

In operation, in the position of the rotor shown in FIG. 1, the windings associated with the pole pieces AA' are supplied with current, and the rotor is in the position of minimum reluctance. If stator pole pieces AA' are de-magnetized and pole pieces BB' magnetized then rotor pole extensions 15 followed by rotor pole pieces 14, will be attracted towards stator pole pieces BB', to reduce the reluctance until the pole pieces are in alignment, the rotor therefore moves the clockwise direction through 60°. On the other hand, if again starting with the rotor structure in the position in which it is shown in FIG. 1, the pole pieces CC' are energised then the rotor structure will move in the anti-clockwise direction. Again the rotor structure will take up the position in which the pole pieces 14 are aligned with the pole pieces CC'. It will be seen therefore that the machine described above is reversible. The reverse motion is achieved by changing the sequence in which the windings of the stator structure are energised.

It will be appreciated that by energising the windings of the pairs of pole pieces in turn, at the correct time and in the correct order, continuous rotation of the stator structure will be achieved in the required direction. This function may be performed by means of a shaft position encoder together with the necessary decoder and amplifier circuits.

The purpose of providing the extensions 15 and 16 and forming the extensions of reduced section is more fully described in the specification of British Pat. No. 1321110. It will be understood, however, that the motor described in the specification of British Pat. No. 1321110, can only rotate in one direction, whereas the example described and claimed herein is capable of reverse rotation.

FIG. 2 demonstrates one way in which the rotor structure 13 can be constructed by using laminations which are identical in size and configuration. In FIG. 2, adjacent laminations 17 are displaced in opposite directions relative to each other. Each lamination at its periphery, subtends an angle of 60° and the degree of angular displacement of the laminations relative to each other is 30°. In this manner, a pole piece 14 is produced which subtends 30° and the extensions 15 and 16 also subtend 30°. The pole pieces 14 however can be regarded as solid whilst the extensions 15 and 16 have half the amount of material in them as compared with the pole pieces 14.

Alternatively the laminations may be grouped so that for example and as shown in FIG. 3, half the laminations are displaced angularly. It should be noted however that the three groups still overlap to provide the main portion of the rotor pole piece.

In order to improve the resulting torque output of the machine as a function of the angular position of the rotor, the laminations may be displaced by varying amounts so that the sides of the extensions are no longer parallel to the axis of the rotor. This has the effect of smoothing out the peaks in the waveform at the instants of coincidence between the edges of the stator and rotor poles or extensions such a modification is shown in FIG. 4 which is a developed view of the rotor pole face.

As has been stated the area of the stator pole face and the rotor pole face should be equal and it is desirable that the cross-sectional area of the stator pole should be at least equal to and preferably greater than the area of the stator pole face. In order to achieve this the main body of the pole has a slightly longer circumferential dimension and the inner end of the pole piece is tapered inwardly to the pole face. This variation is seen in dotted outline at 18 in the stator pole C of FIG. 1.

We claim:

1. A variable reluctance electric motor comprising a stator structure and a rotor structure, said rotor structure comprising a pair of interconnected rotor pole pieces defining at their outer ends rotor pole faces, said stator structure comprising at least three pairs of diametrically disposed stator pole pieces mounted about the rotor structure and defining stator pole faces at their inner ends, said rotor pole faces and said stator pole faces being axially aligned, windings surrounding at least one pole of each of said pairs of stator pole pieces, said windings in use being energized sequentially to cause rotation of the rotor structure, the rotor pole pieces each having circumferential extensions on opposite sides thereof, said extensions when a stator pole face is aligned with a rotor pole face, extending circumferentially beyond the stator pole face, the extensions having a smaller cross sectional area than the rotor pole face, the arrangement being such that depending upon the order in which the stator windings are energized, the rotor structure will move in one direction to minimize the reluctance of the magnetic path constituted by the stator and rotor structures.

2. A motor as claimed in claim 1 in which the areas of the rotor pole faces are substantially equal to the areas of the stator pole faces.

3. A motor as claimed in claim 2 in which the circumferential length of the rotor pole faces is substantially equal to the circumferential length of the stator pole faces.

4. A motor as claimed in claim 1 in which the rotor structure is formed from a stack of laminations at least some of which are angularly displaced relative to the remaining laminations of the stack so as to define said extensions.

5. A motor as claimed in claim 3 in which said extensions when a stator pole face is aligned with a rotor pole face extend to the adjacent side faces of the adjacent stator pole pieces.

6. A motor as claimed in claim 5 in which said extensions overlap the adjacent stator pole pieces up to half the circumferential length of the stator pole pieces.

7. A motor as claimed in claim 3 in which the cross sectional area of the stator pole pieces is at least equal to the cross sectional area of the stator pole faces.

8. A motor as claimed in claim 7 in which the main body of each stator pole piece is tapered towards the stator pole face.

9. A motor as claimed in claim 4 in which the extent of displacement of the laminations varies throughout the length of the rotor.

* * * * *